US012710002B2

(12) United States Patent
Mendonca et al.

(10) Patent No.: US 12,710,002 B2
(45) Date of Patent: Aug. 18, 2026

(54) CONTROLLER, METHOD, AND ENGINE SYSTEM FOR ENGINE CRANK CONTROL

(71) Applicant: Cummins Power Generation Inc., Minneapolis, MN (US)

(72) Inventors: Jameson Silvex Mendonca, Pune (IN); Ninad Vaidya, Pune (IN); Shivi Kapoor, Pune (IN); Rajendra Nathu Gund, Pune (IN); Pravin Amarsingh Suryawanshi, Pune (IN); Pradheepram Ottikkutti, Pune (IN); Ashutosh Shriniwas Chaware, Pune (IN)

(73) Assignee: Cummins Power Generation Inc., Minneapolis, MN (US)

( * ) Notice: Subject to any disclaimer, the term of this patent is extended or adjusted under 35 U.S.C. 154(b) by 0 days.

(21) Appl. No.: 19/177,230

(22) Filed: Apr. 11, 2025

(65) Prior Publication Data

US 2025/0361824 A1 Nov. 27, 2025

(30) Foreign Application Priority Data

May 22, 2024 (IN) ............................. 202421039930

(51) Int. Cl.
*F01M 1/20* (2006.01)
*F01M 1/22* (2006.01)
(Continued)

(52) U.S. Cl.
CPC .............. *F01M 11/10* (2013.01); *F01M 1/20* (2013.01); *F01M 1/22* (2013.01); *F01M 11/12* (2013.01);
(Continued)

(58) Field of Classification Search
CPC .. F01M 1/18; F01M 1/20; F01M 1/22; F01M 1/24; F01M 1/26; F01M 1/28; F01M 11/10; F01M 11/12
(Continued)

(56) References Cited

U.S. PATENT DOCUMENTS 3,116,729 A * 1/1964 Crowe ..................... F01M 1/24
340/451
3,973,546 A * 8/1976 Scott ....................... F02N 11/10
123/198 D
(Continued)

FOREIGN PATENT DOCUMENTS

CN 104948256 B 9/2015
CN 111946418 A 11/2020
(Continued)

OTHER PUBLICATIONS

Office Action in GB Application No. GB2506979.0 dated Sep. 26, 2025, 7 pgs.

*Primary Examiner* — Erick R Solis
(74) *Attorney, Agent, or Firm* — Foley & Lardner LLP

(57) ABSTRACT

An engine crank controller is provided. The engine crank controller permits cranking of an engine responsive to receiving an indication of a sufficient amount of an oil for the cranking of the engine, monitors, during a period subsequent to initiation of the cranking of the engine, a pressure of the oil of a lubrication system, in response to the pressure being less than a threshold, stops the engine by preventing the cranking, and, in response to the pressure being equal to or greater than the threshold, continues permitting the cranking.

20 Claims, 6 Drawing Sheets

(51) Int. Cl.
*F01M 11/10* (2006.01)
*F01M 11/12* (2006.01)
*F02N 11/08* (2006.01)

(52) U.S. Cl.
CPC ...... *F02N 11/08* (2013.01); *F01M 2011/1446* (2013.01)

(58) Field of Classification Search
USPC ................................ 123/179.3, 179.4, 196 S
See application file for complete search history.

(56) References Cited

U.S. PATENT DOCUMENTS

| | | | | | |
|---|---|---|---|---|---|
| 4,563,987 | A * | 1/1986 | Geary | F02N 11/0811 | 123/179.3 |
| 4,637,359 | A * | 1/1987 | Cook | F02N 11/0807 | 290/38 C |
| 4,890,695 | A * | 1/1990 | Morris | F01M 11/12 | 123/196 R |
| 5,072,703 | A * | 12/1991 | Sutton | F02N 11/0803 | 307/10.6 |
| 5,301,643 | A * | 4/1994 | Garcyalny | F01L 13/085 | 123/198 D |
| 5,743,231 | A | 4/1998 | Reinosa | | |
| 6,111,499 | A | 8/2000 | Morikami | | |
| 7,498,932 | B1 | 3/2009 | Steffen | | |
| 8,065,986 | B2 | 11/2011 | Sachdev et al. | | |
| 9,031,767 | B2 * | 5/2015 | Yoshihara | F02D 37/00 | 123/198 C |
| 9,316,132 | B2 | 4/2016 | Mc Donald | | |
| 9,404,403 | B2 | 8/2016 | McDonald | | |
| 2007/0182251 | A1 * | 8/2007 | Miyashita | F01M 11/12 | 307/10.6 |
| 2010/0179747 | A1 * | 7/2010 | McCormick | G01F 23/70 | 340/623 |
| 2013/0030677 | A1 * | 1/2013 | Steffen | F01M 1/26 | 701/112 |
| 2013/0118593 | A1 | 5/2013 | Wright | | |
| 2014/0123931 | A1 * | 5/2014 | Mavinahally | F01M 9/06 | 123/196 R |
| 2015/0066331 | A1 * | 3/2015 | Bartolatta | G07C 5/08 | 701/99 |
| 2020/0318597 | A1 * | 10/2020 | Dudar | F02N 11/0818 | |

FOREIGN PATENT DOCUMENTS

| | | | |
|---|---|---|---|
| CN | 114753955 | B | 8/2023 |
| DE | 35 06 705 | A1 | 9/1985 |
| EP | 0 426 758 | B1 | 5/1991 |
| EP | 1 040 258 | A1 | 10/2000 |
| GB | 2 491 626 | A | 12/2012 |
| WO | WO-99/20875 | | 4/1999 |

* cited by examiner

CONTROLLER, METHOD, AND ENGINE SYSTEM FOR ENGINE CRANK CONTROL

CROSS-REFERENCE TO RELATED APPLICATION

This application claims the benefit of and priority to India Non-provisional patent application No. 202421039930, filed May 22, 2024, which is incorporated herein by reference in its entirety and for all purposes.

TECHNICAL FIELD

The present disclosure relates generally to systems and methods for engine crank control. More specifically, the present disclosure relates to limiting cranking of an engine based on an oil available to the engine.

BACKGROUND

Oil is used to lubricate moving parts of an internal combustion engine. In many implementations, the oil is provided and collected in a reservoir at the bottom of a crankcase of an engine, which is often referred to as an oil pan. An oil pump draws the oil from the oil pan through a suction tube. The oil is then provided to the crankshaft, connecting rod bearings, and other engine components, and is also applied onto the cylinder walls. Eventually, the oil drips off of the engine components and collects into the oil pan, from which it may be recirculated through the engine.

SUMMARY

One embodiment relates to an engine crank controller that permits cranking of an engine responsive to receiving an indication of a sufficient amount of an oil for the cranking of the engine, monitors, during a period subsequent to initiation of the cranking of the engine, a pressure of the oil of a lubrication system, in response to the pressure being less than a threshold, stops the engine by preventing the cranking, and, in response to the pressure being equal to or greater than the threshold, continues permitting the cranking.

In some embodiments, the indication is a first indication, and the engine crank controller, prior to receiving the first indication, prevents the cranking responsive to receiving a second indication of an insufficient amount of the oil for the cranking of the engine.

In some embodiments, the engine crank controller causes presentation of a first message requesting a confirmation from a user that there is the sufficient amount of the oil for the cranking of the engine, receives a user interaction associated with the second indication, and, in response to receiving the second indication, causes presentation of a second message requesting an increase in oil amount.

In some embodiments, the indication, received by the engine crank controller, is associated with a level of the oil in an oil pan of the lubrication system being equal to or above a threshold level.

In some embodiments, the period is associated with a number of cranking attempts, and the engine crank controller, in response to stopping the engine and the number of cranking attempts being greater than a crank counter threshold, recycles power of the engine crank controller, and, in response to stopping the engine and the number of cranking attempts being less than the crank counter threshold, permits the cranking until the number of cranking attempts is equal to the crank counter threshold. The engine crank controller, in response to stopping the engine and the number of cranking attempts being equal to the crank counter threshold, monitors a new pressure of the oil of the lubrication system, in response to the new pressure being less than the threshold, stops the engine, and permits the cranking until the number of cranking attempts is greater than the crank counter threshold.

In some embodiments, the engine crank controller, in response to recycling the power of the engine crank controller, requests input associated with an amount of the oil.

In some embodiments, the engine crank controller recycles power of the engine crank controller responsive to the pressure being less than the threshold.

One embodiment relates to a method for engine crank control that includes preventing, by a controller, cranking of an engine, causing presentation of, by the controller on a display, a message requesting a confirmation from a user that a sufficient amount of an oil is available for the cranking of the engine, and, in response to receiving a user interaction indicative of the sufficient amount of the oil being available, permitting, by the controller, the cranking. The method further includes monitoring, by the controller during a period subsequent to initiation of the cranking of the engine, a pressure of the oil of a lubrication system, and, in response to the pressure being equal to or greater than a threshold, continuing to permit, by the controller, the cranking.

In some embodiments, monitoring the pressure of the oil includes receiving, by the controller, a first oil pressure signal associated with a first oil pressure. The method further includes, in response to the first oil pressure being equal to or greater than the threshold, continuing to permit, by the controller, the cranking and receiving, by the controller, a second oil pressure signal associated with a second oil pressure, in response to receiving the second oil pressure signal, determining, by the controller, an oil pressure trend, and, in response to the oil pressure trend being constant or negative, stopping, by the controller, the engine.

In some embodiments, the oil pressure trend is determined based on the first oil pressure and the second oil pressure.

In some embodiments, the period is associated with a number of cranking attempts. Monitoring the pressure of the oil includes, in response to the number of cranking attempts being equal to or greater than a crank counter threshold, receiving, by the controller, a plurality of first oil pressure signals associated with a plurality of first oil pressures for a first time period. The method further includes, in response to the first oil pressures being equal to or greater than the threshold for the first time period, continuing to permit, by the controller, the cranking and receiving, by the controller, a plurality of second oil pressure signals associated with a plurality of second oil pressures for a second time period, and, in response to an oil pressure trend of the second oil pressures being constant or negative, stopping, by the controller, the engine.

In some embodiments, the second time period is less than the first time period.

In some embodiments, the method further includes, in response to the oil pressure trend of the second oil pressures being positive, continuing, by the controller, to permit the cranking.

In some embodiments, the stopping of the engine is responsive to the oil pressure trend of the second oil pressures being constant or negative for a third time period.

In some embodiments, the third time period is equal to the second time period.

In some embodiments, the method further includes, in response to the oil pressure trend of the second oil pressure not being constant or negative for a third time period, continuing, by the controller, to permit the cranking.

One embodiment relates to an engine system that includes an engine, a lubrication system that lubricates the engine, and a controller. The controller prevents cranking of the engine, permits cranking of the engine responsive to receiving an indication of a sufficient amount of an oil for the cranking of the engine, and receives, during a period subsequent to initiation of the cranking of the engine, a plurality of first oil pressure signals associated with a plurality of first oil pressures for a first time period. The controller further, in response to the first oil pressures being equal to or greater than an oil pressure threshold for the first time period, continues permitting the cranking and receives a plurality of second oil pressure signals associated with a plurality of second oil pressures for a second time period, and, in response to an oil pressure trend of the second oil pressures being positive, continues permitting the cranking.

In some embodiments, the indication is associated with an oil amount being equal to or greater than an oil amount threshold. The controller further causes presentation of, on a display, a message requesting a confirmation from a user that the oil amount is equal to or greater than the oil amount threshold, and receives, from an input device, a user interaction associated with the indication.

In some embodiments, the display includes the input device.

In some embodiments, the engine includes a main oil gallery, and the engine system further includes a pressure sensor located at least partially within the main oil gallery.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Following below are more detailed descriptions of various concepts related to, and implementations of, methods, apparatuses, and systems for engine crank control. Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Engines, including but not limited to engines of engine system, generators, and/or generator sets, can be operated in various conditions. This can include, for example, cold start conditions. Engines can require lubrication between various moving components for proper operation. However, it can be challenging to determine a sufficient amount of lubrication for a given condition under which the engine is to be started and/or operated, as well as to verify that a sufficient amount of lubrication is present. While some sensors can be used to detect the presence of a lubricant, it can be challenging to deploy the sensors in locations in the engine and/or the engine system where it may be useful to detect the presence of the lubricant in order to verify whether sufficient lubrication is present. As such, when initiating operation of the engine, there may not be a readily detectable indication regarding the presence of lubrication and/or sufficient lubrication. Systems and methods in accordance with the present disclosure can address various such considerations by selectively managing the engine start process (e.g., managing engine cranking) to allow for lubricant presence and/or flow to be monitored, such as to verify that sufficient lubrication is present where needed for proper engine operation given the condition(s) under which the engine is being operated.

Figure 1:
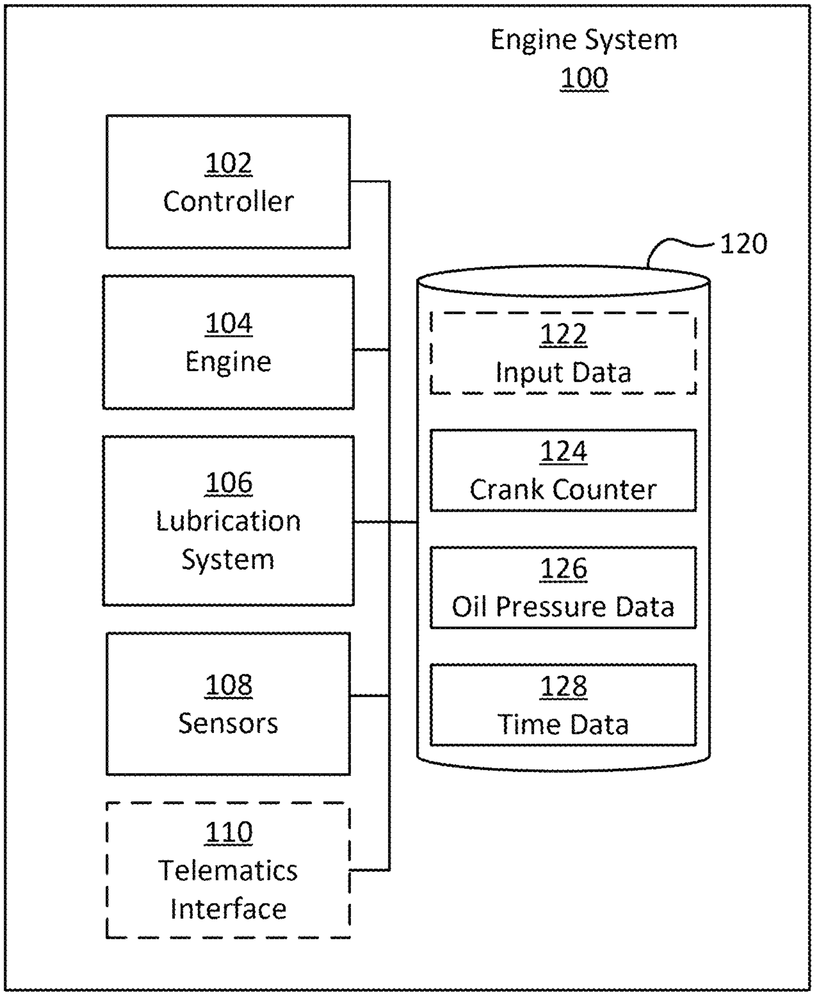
FIG. 1 is a block diagram of an engine system including a controller, a lubrication system, and an engine, according to some embodiments.

FIG. 1 illustrates an engine system 100. The engine system 100 includes an engine 104, a lubrication system 106 configured to lubricate the engine 104, and a controller 102. The controller 102 is configured to prevent cranking of the engine 104, permit cranking of the engine 104 responsive to receiving an indication of a sufficient amount of an oil for the cranking of the engine 104, and receive, during a period subsequent to initiation of the cranking of the engine 104, a plurality of first oil pressure signals associated with a plurality of first oil pressures for a first time period. The controller 102 is further configured to, in response to the first oil pressures being equal to or greater than an oil pressure threshold for the first time period, continue permitting the cranking and receive a plurality of second oil pressure signals associated with a plurality of second oil pressures for a second time period, and, in response to an oil pressure trend of the second oil pressures being positive, continue permitting the cranking.

Figure 2:
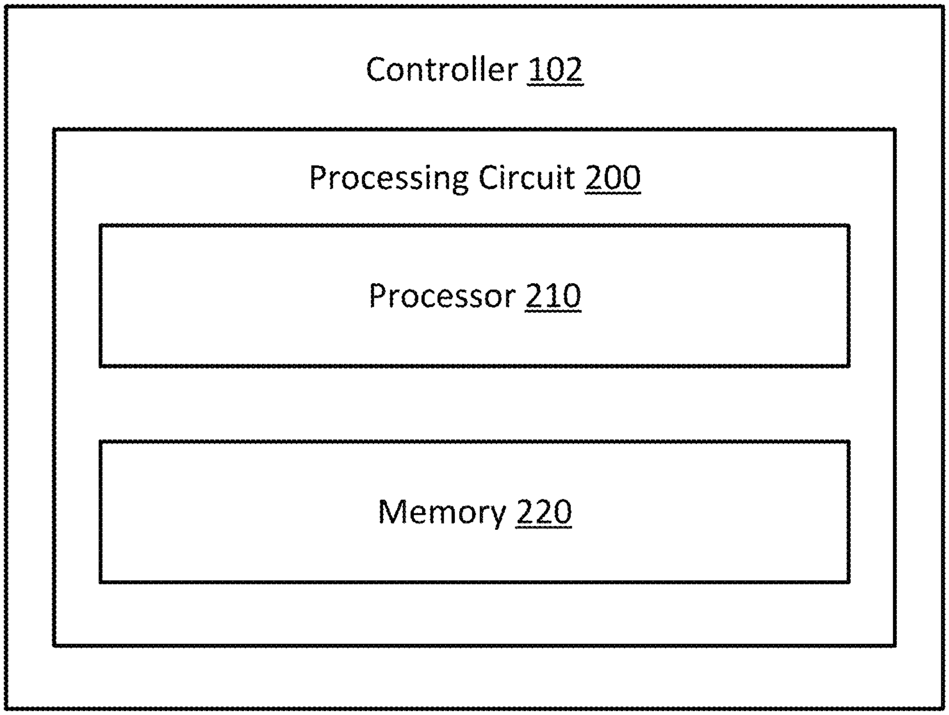
FIG. 2 is a block diagram illustrating an example architecture of the controller of FIG. 1, according to some embodiments.

As illustrated in FIG. 2, the controller 102 (e.g., an engine crank controller, etc.) can include a processing circuit 200. The processing circuit 200 can include, or interface with, a processor 210 and a memory 220. The processor 210 can be implemented as a specific purpose processor, an application specific integrated circuit (ASIC), one or more field programmable gate arrays (FPGAs), a group of processing components, or other suitable electronic processing components. The processor 210 and the memory 220 can be implemented using one or more devices, such as devices in a client-server implementation. The memory 220 can include one or more devices (e.g., random access memory (RAM), read-only memory (ROM), flash memory, hard disk storage, etc.) for storing data and computer code for completing the various operations described herein. The memory 220 can be or include volatile memory or non-volatile memory and can include database components, object code components, script components, or any other type of information structure for supporting the various activities and information structures of the present disclosure. The memory 220 can be communicably connected to the processor 210 and include computer code or instruction modules for executing one or more processes described herein. The memory 220 can include various circuits, software engines, and/or modules that cause the processor 210 to execute the systems (e.g., the engine system 100, etc.) and methods (e.g., method 400, method 500, etc.) described herein. The processing circuit 200 can include one or more of the processor 210 and/or one or more of the memory 220.

The controller 102 can include or be coupled with communications electronics. The communications electronics can conduct wired and/or wireless communications. For example, the communications electronics can include one or more wired (e.g., Ethernet, Modbus, PCIe, AXI, CAN (e.g., J1939), etc.) or wireless transceivers (e.g., a Wi-Fi transceiver, a Bluetooth transceiver, an NFC transceiver, a cellular transceiver, etc.). The communications electronics can couple the controller 102 to one or more components of the engine system 100.

The controller 102 is structured to control, at least partly, the operation of the engine system 100 and its components. Communication between and among the components can be via any number of wired or wireless connections. In some embodiments, a controller area network (CAN) bus provides the exchange of signals, information, and/or information. The CAN bus includes any number of wired and wireless connections. The controller 102 can be, include, or interface with one or more electronic control units (ECU) coupled with the engine 104 and/or the engine system 100. The controller 102 can receive information from one or more components of the engine system 100.

The engine 104 can be an internal combustion engine, such as a spark-ignition engine or a compression-ignition engine. Examples of the engine 104 include a hydrogen engine, a diesel engine, a gasoline engine, a propane engine, a dual-fuel engine, a natural gas engine, etc. The engine 104 can be configured to receive a fluid mixture of a fuel (e.g., hydrogen, diesel, gasoline, propane, natural gas, etc., or a combination of fuels) and air, and combust the fluid mixture to produce energy that can be utilized by various outputs. For example, the engine 104 can produce energy that is utilized to drive a movement member (e.g., wheel, tread, propeller, impeller, turbine, rotor, etc.) or power a generator. The engine 104 can be implemented in a vehicle (e.g., truck, car, construction vehicle, freight vehicle, commercial vehicle, emergency vehicle, military vehicle, maritime vehicle, etc.).

As illustrated in FIG. 1, the engine system 100 can include one or more sensors 108 that are electrically or communicatively to the controller 102. Each of the one or more sensors 108 is configured to transmit signals to the controller 102, and the controller 102 is configured to determine a state or a value associated with a respective sensor of the sensors 108 and/or an environment in which the respective sensor is located.

In some embodiments, at least one of the sensors 108 is a pressure sensor configured to transmit a pressure signal to the controller 102 that is associated with a pressure of the oil that is available to the engine 104. The controller 102 is configured to receive the pressure signal from the pressure sensor (e.g., at least one of the sensors 108) and determine the pressure of the oil based on the pressure signal. The controller 102 can be configured to control (e.g., limit, permit, initiate, etc.) cranking of the engine 104 (e.g., permit cranking, prevent cranking, etc.) based on the determined pressure of the oil.

The engine system 100 can include a coolant that is communicated to (e.g., driven by a pump to one or more passages of) the engine 104. The engine 104 can include an engine block that can receive the coolant through various passages to manage a temperature of the engine 104. For example, the coolant can cycle through a fluidic circuit between the engine block and a heat exchange device (e.g., radiator, etc.). The coolant can manage the temperature of the engine 104 by transporting heat away from the engine 104 (e.g., for dissipation at the heat exchange device, such as when the engine 104 operating at high load, etc.), or into the engine 104 (e.g., contributing thermal energy to the engine 104, such as prior to or following a cold start, where contribution of the thermal energy can result in more complete combustion to lower output at startup, etc.).

In some embodiments, at least one of the sensors 108 is an oil amount sensor configured to transmit an amount signal to the controller 102 that is associated with an amount of the oil (e.g., oil level, oil volume, oil mass, etc.) that is available to the engine 104. In some examples, the amount of the oil available to the engine 104 is equal to, or approximately equal to (e.g., +/−10%, +/−5%, +/−1%, etc.), an amount of the oil available in an oil pan of the lubrication system 106. The controller 102 is configured to receive the signal from the oil amount sensor (e.g., at least one of the sensors 108) and determine the amount of the oil based on the amount signal. The controller 102 can be configured to control cranking of the engine 104 (e.g., permit cranking, prevent cranking, etc.) based on the determined amount of the oil. In some embodiments, receiving the indication of the sufficient amount of oil for cranking includes determining that the amount of the oil is equal to or greater than an amount threshold. The controller 102 can determine the amount of the oil based on the amount signal.

The sensors 108 can be real (e.g., physical, etc.) or virtual (e.g., a non-physical sensor that is structured as program logic in the controller 102 that makes various estimations or determinations). For example, the pressure sensor (e.g., at least one of the sensors 108) can be a real or a virtual sensor arranged to measure or otherwise acquire data, values, or information indicative of the pressure of the oil within the engine system 100 (e.g., within the engine 104, within the lubrication system 106, etc.). When structured as a real sensor, the pressure sensor is structured to send the pressure signal to the controller 102 that is indicative of the oil pressure within the engine system 100. When the pressure sensor is structured as a virtual sensor, at least one input can be used by the controller 102 in an algorithm, model, lookup table, etc. to determine or estimate the oil pressure within the engine system 100.

Similar to the pressure sensor, the oil amount sensor (e.g., at least one of the sensors 108) can be a real or a virtual sensor arranged to measure or otherwise acquire data, values, or information indicative of the amount of the oil available to the engine 104. When structured as a real sensor, the oil amount sensor is structured to send the amount signal to the controller 102 that is indicative of the oil amount available to the engine 104. When structured as a virtual sensor, at least one input can be used by the controller 102 in an algorithm, model, lookup table, etc. to determine or estimate the oil amount available to the engine 104.

In some embodiments, the engine system 100 does not include the oil amount sensor (e.g., at least one of the sensors 108), thereby reducing installation complexity, cost, and weight associated with including the oil amount sensor. In these embodiments, the engine system 100 can rely on input from the user regarding the amount of the oil available to the engine 104.

The engine system 100 can include a telematics interface 110 configured to exchange information between the engine system 100 and a remote device (i.e., a device remote therefrom). For example, the telematics interface 110 can provide information (e.g., indications of a status of the engine system 100, information of the data repository 120, etc.) to the remote device and/or receive commands associated with engine system 100 from the remote device. The controller 102 can exchange information (e.g., commands or status information) with the telematics interface 110 via the communications electronics, such as the Modbus, J1939, or other transceivers as disclosed herein. For example, the telematics interface 110 can establish a communicative connection with one or more remote devices, such as via a short message service (SMS), email, or other message provided over a wired or wireless link with the one or more remote devices.

The engine system 100 can include a data repository 120 (e.g., database, server, etc.). The data repository 120 can include one or more local or distributed databases and/or a database management system. The data repository 120 can include input data 122 provided by the user, the controller 102, the engine 104, the lubrication system 106, the sensors 108, and/or the telematics interface 110. The input data 122 can be associated with the oil. For example, the input data 122 can correspond to the amount of the oil (e.g., oil level, oil volume, oil mass, etc.) available to the engine 104 and/or a binary value associated with whether the amount of the oil available to the engine 104 is sufficient (i.e., the amount of the oil available to the engine 104 is equal to or above a sufficient threshold). In some embodiments, the binary value is associated with a user interaction received by the controller 102 from a user (e.g., an operator, a technician, etc.) via a user interface (e.g., display, input device, etc.). The input data 122 can additionally, or alternatively, include additional and/or other properties of the oil, such as density, temperature, viscosity, or the like.

The data repository 120 can include a crank counter 124 provided by the controller 102. The crank counter 124 identifies a number of times the engine 104 has cranked. In some embodiments, the crank counter 124 includes a revolution counter. The revolution counter identifies one revolution of a flywheel ring gear of the engine 104 and counts the number of revolutions of the flywheel ring gear as it is rotated by a barring tool. Each full revolution of the flywheel ring gear can be considered as one count of cranking. In some embodiments, the crank counter 124 is based on a speed of the engine 104 exceeding a predetermined speed. For example, at key-on, a starter motor can engage the flywheel and cause the crankshaft to rotate resulting in the engine 104 firing. One count of cranking can be determined when the speed of the engine 104 exceeds the predetermined speed. In some examples, the predetermined speed is approximately 50 revolutions-per-minute (RPM). In other examples, the predetermined speed is less than or greater than 50 RPM. In some embodiments, the crank counter 124 is based on a key switch of the engine 104 switching between an on position and an off position, where one count of cranking can be determined when the key switch switches from the on position to the off position.

The data repository 120 can include oil pressure data 126 provided by the controller 102 and/or the pressure sensor (e.g., at least one of the sensors 108, etc.). The oil pressure data 126 includes pressure values associated with the oil. In some examples, the oil pressure data 126 includes pressure signals from the pressure sensor that are each associated with a pressure value of the oil. In some examples, the oil pressure data 126 includes pressure values of the oil from the controller 102 that are determined by the controller 102 based on the pressure signals from the pressure sensor (e.g., at least one of the sensors 108, etc.).

The data repository 120 can include time data 128 provided by the controller 102. The time data 128 includes time values associated with one or more timers (e.g., time periods, etc.) set and/or recorded by the controller 102. For example, the time data 128 can include multiple values associated with a timer, such as a starting time of the timer, an ending time of the timer, and current time progress of the timer (i.e., how much time of the timer has passed). In some embodiments, the controller 102 sets the timers to be associated with pressure readings determined by the controller 102 based on the pressure signals received from the pressure sensor (e.g., at least one of the sensors 108, etc.).

Each of the input data 122, the crank counter 124, the oil pressure data 126, and/or the time data 128, can be associated with one or more time stamps. The time stamps can include a receipt time stamp associated with a time in which corresponding data was received, a store time stamp associated with a time in which the corresponding data was saved in the data repository 120, an expiry time stamp associated with a time in which the corresponding data is to expire (i.e., be replaced with an updated data, be considered outdated, etc.), or the like.

Figure 3:
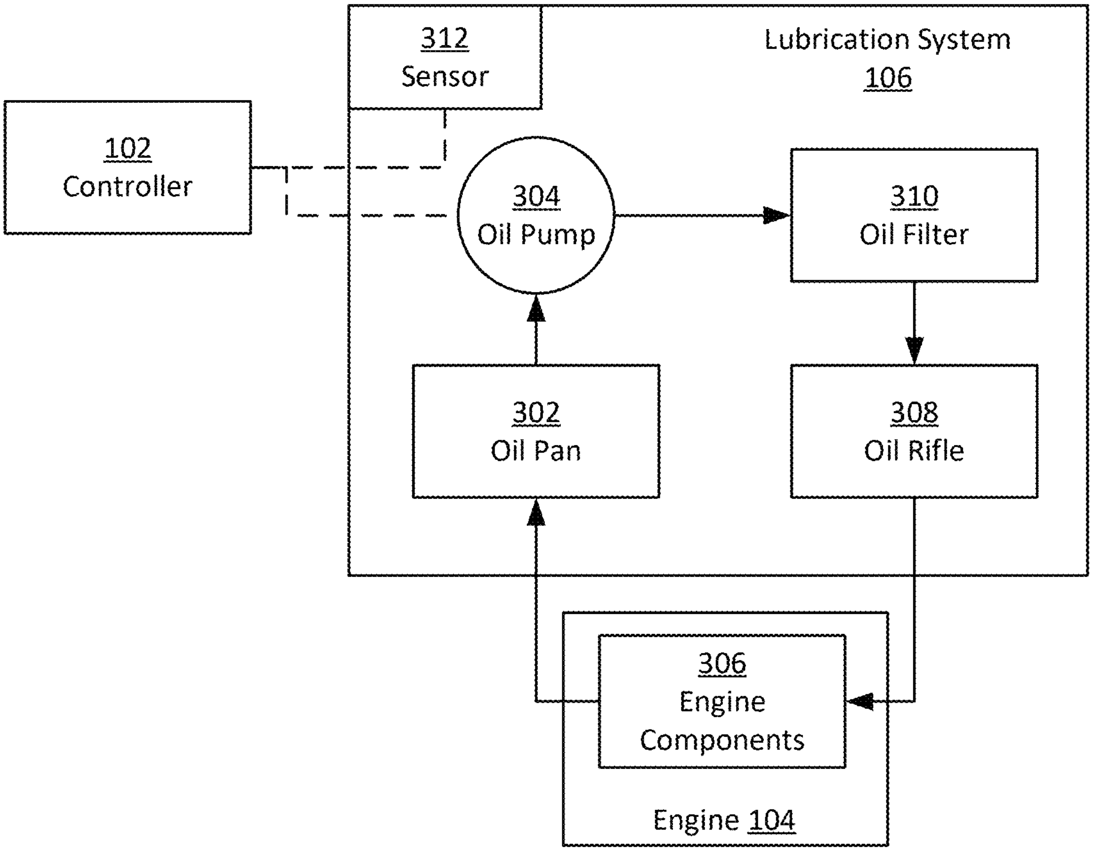
FIG. 3 is a block diagram of the lubrication system, the controller, and the engine of FIG. 1, according to some embodiments.

FIG. 3 illustrates the lubrication system 106. The lubrication system 106 can include an oil pan 302. The oil pan 302 can be disposed below the engine 104 and configured to retain the oil for the engine 104. The lubrication system 106 can include an oil pump 304 that is electrically or communicatively coupled to the controller 102 and fluidly coupled to the oil pan 302. The oil pump 304 is configured to receive the oil from the oil pan 302, pressurize the oil, and provide the oil to the engine 104.

In some embodiments, the engine 104 includes engine components 306, such as a crankshaft, one or more connecting rod bearings, one or more cylinder walls, or the like, and the lubrication system 106 includes an oil rifle 308 (e.g., an oil passage, etc.) machined into an engine block of the engine 104 and configured to direct the oil to engine components 306 of the engine 104. The oil rifle 308 is fluidly coupled to the oil pump 304. In these embodiments, the oil pump 304 is configured to provide the oil to the engine 104 by providing the oil to the oil rifle 308.

The lubrication system 106 can include an oil filter 310 configured to at least partially remove particles (e.g., contaminants, etc.) from the oil. The oil filter 310 cam be disposed downstream of the oil pump 304 and upstream of the engine 104 and/or the oil rifle 308. The oil filter 310 can be disposed upstream of the oil pump 304. For example, the oil filter 310 can be disposed upstream of the oil pump 304 and downstream of the oil pan 302.

The lubrication system 106 can include one or more sensors 312 similar to the sensors 108 described herein. At least one of the sensors 312 can be the pressure sensor (e.g., at least one of the sensors 108, etc.). At least one of the sensors 312 can be the amount sensor (e.g., at least one of the sensors 108, etc.). In some embodiments, the engine 104 includes an main oil gallery and the pressure sensor is located at least partially within the main oil gallery (i.e., the pressure sensor senses pressure of the oil within the main oil gallery). The main oil gallery can include the oil rifle 308. The pressure sensor (e.g., at least one of the sensors 108, at least one of the sensors 312, etc.) can be located downstream of the oil filter 310 and upstream of the oil rifle 308. The pressure sensor (e.g., at least one of the sensors 108, at least one of the sensors 312, etc.) can be located downstream of the oil pump 304 and upstream of the oil filter 310 and/or the oil rifle 308. The pressure sensor (e.g., at least one of the sensors 108, at least one of the sensors 312, etc.) can be located downstream of the engine 104 and/or the engine components 306 and upstream of the oil pan 302.

Figure 4:
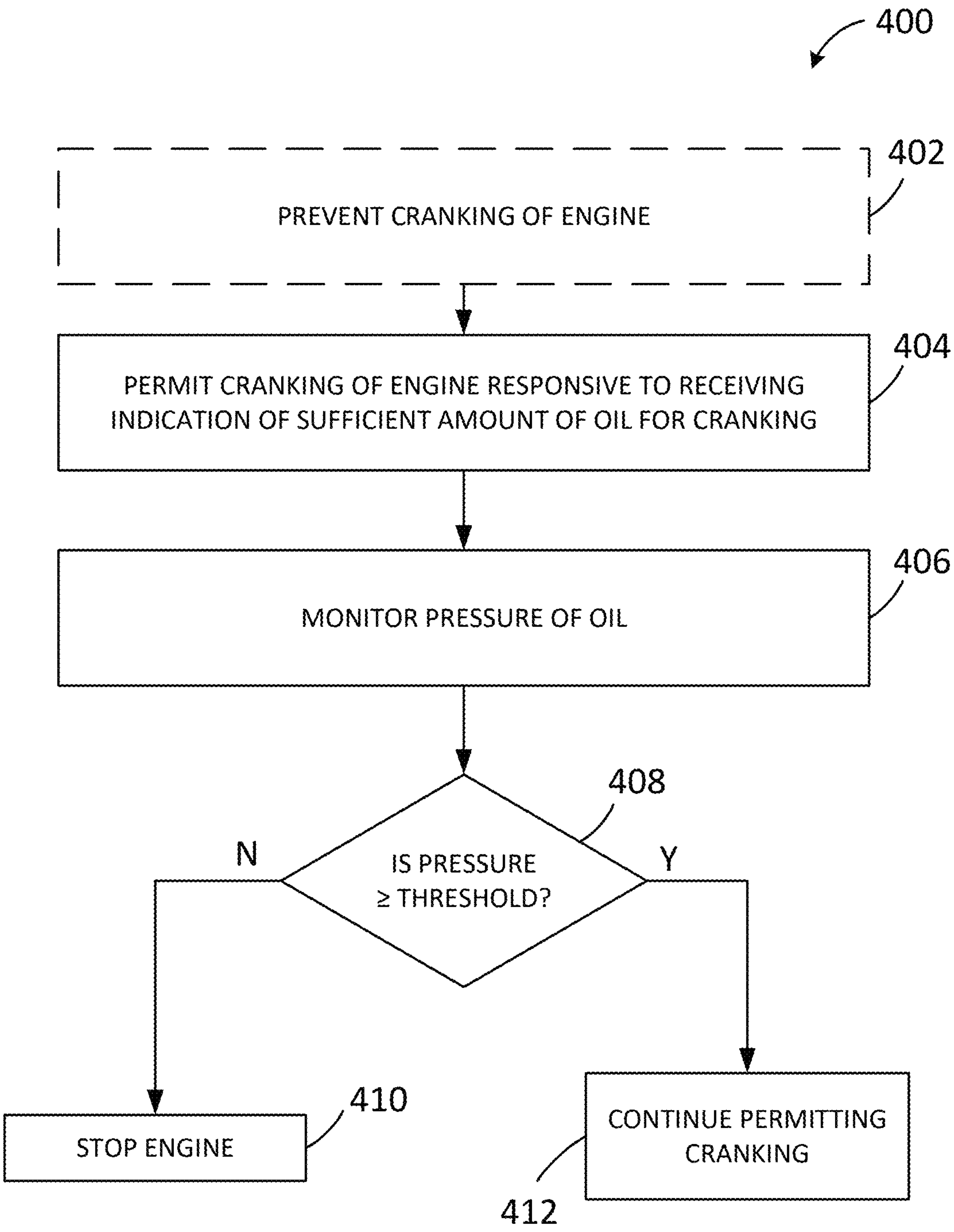
FIG. 4 is a flow diagram of a method for engine crank control of the engine system, according to some embodiments.

FIG. 4 illustrates a flow diagram of the method 400 for engine crank control of the engine system 100, according to some embodiments. The method 400 can be performed by the controller 102 including various circuits, instructions, processors, or other logical elements, such as the logical elements described at FIG. 6 or otherwise herein. The method 400 can be performed responsive to detection (e.g., by the controller 102) of a start event for the engine 104. The method 400 can include (e.g., at 404) permitting cranking of the engine 104 responsive to receiving an indication of a sufficient amount of the oil for the cranking of the engine 104. The method 400 can include (e.g., at 406) monitoring pressure of the oil. For example, the method 400 can include monitoring, during a period subsequent to initiation of the cranking of the engine 104, a pressure of the oil of the lubrication system 106. The method 400 can include (e.g., at 410), in response to the pressure of the oil being less than the threshold, stopping the engine. For example, the method 400 can include, in response to the pressure being less than a threshold, stopping the engine 104 by preventing the cranking.

The method 400 can include (e.g., at 402) preventing cranking of the engine 104. The method 400 can include (e.g., at 408) determining whether the pressure of the oil is greater than or equal to the threshold. The method 400 can include (e.g., at 412), in response to the pressure being equal to or greater than the threshold, continuing to permit the cranking.

Referring again to operation 402, the cranking of the engine 104 can be prevented. The controller 102 can prevent the cranking of the engine 104 by preventing the crankshaft of the engine 104 from rotating. For example, the controller 102 can prevent the crankshaft from rotating due to combustion in the engine 104 and/or due to an electric machine (e.g., an electric starter, the starter motor, etc.) rotating the crankshaft. The controller 102 can prevent the crankshaft from rotating by not transmitting a control signal to the electric machine to rotate the crankshaft.

Referring again to operation 404, the cranking of the engine 104 can be permitted responsive to receiving an indication of a sufficient amount of the oil for the cranking. The controller 102 can permit the cranking of the engine 104 by permitting the crankshaft of the engine 104 to rotate. For example, the controller 102 can permit the crankshaft to rotate due to the combustion in the engine 104 and/or due to the electric machine. The controller 102 can receive the indication of sufficient amount of the oil from the user via the user interface. The controller 102 can receive the indication of sufficient amount of the oil from the amount sensor (e.g., at least one of the sensors 108, at least one of the sensors 312, etc.). The indication, received by the controller 102, can be associated with an oil amount being equal to or greater than an oil amount threshold. For example, the indication, received by the controller 102, can be associated with a level of the oil in the oil pan 302 of the lubrication system 106 being equal to or above a threshold level. The oil amount threshold (e.g., the threshold level, etc.) can correspond to a minimum amount (e.g., level, etc.) of the oil sufficient for the engine 104 to crank and/or to start without dry running (i.e., running with insufficient amount of the oil, etc.), thereby protecting the engine 104 from damage.

Referring again to operation 406, the pressure of the oil can be monitored. The controller 102 can monitor the pressure of the oil by determining oil pressure values via the pressure signals received from the pressure sensor (e.g., at least one of the sensors 108, at least one of the sensors 312, etc.). The controller 102 can monitor the pressure of the oil during a period subsequent to initiation of the cranking of the engine 104 (i.e., after the engine 104 has been cranked), which allows the oil pump 304 to pump the oil to the engine 104 (e.g., the engine components 306, the oil rifle 308, the main oil gallery, etc.) during the cranking, thereby increasing accuracy of the oil pressure readings (i.e., relative to oil pressure readings obtained prior to initiation of the cranking).

Referring again to operation 408, it is determined whether the pressure of the oil (determined at 406) is greater than or equal to the threshold. A pressure value that the controller 102 compares to the threshold can be a single pressure value that is associated with a most-recently (e.g., newest, last, etc.) received pressure signal from the pressure sensor (e.g., at least one of the sensors 108, at least one of the sensors 312, etc.). The pressure value that the controller 102 compares to the threshold can be a statistic of multiple pressure values. For example, the pressure value that the controller 102 compares to the threshold can be a minimum, a maximum, a mean, a median, or a mode of multiple pressure values associated with received pressure signals from the pressure sensor (e.g., at least one of the sensors 108, at least one of the sensors 312, etc.). In some embodiments, the threshold (i.e., pressure threshold) is associated with a minimum oil pressure value sufficient for cranking of the engine 104 and/or for the engine 104 to start without dry running, thereby protecting the engine 104 from damage. The threshold can be equal to, or approximately equal to, 4 pounds per square inch gauge (psig). The threshold can be less than 4 psig (e.g., 0 psig, 2 psig, etc.) or greater than 4 psig (e.g., 5 psig, 13 psig, etc.).

In some embodiments, the threshold is based on an engine speed of the engine 104. For example, at an engine speed between approximately 100 RPM and approximately 150 RPM, the threshold can be approximately 4.5 psig. At an engine speed between approximately 200 RPM and approximately 250 RPM, the threshold can be approximately 7 psig. At an engine speed of approximately 600 RPM, the threshold can be approximately 36 psig. It is to be appreciated that, at the engine speed between approximately 100 RPM and approximately 150 RPM, the threshold can be greater than or less than 4.5 psig, at the engine speed between approximately 200 RPM and approximately 250 RPM, the threshold can be greater than or less than 7 psig, and, at the engine speed of approximately 600 RPM, the threshold can be greater than or less than 36 psig.

Referring again to operation 410, in response to determining that pressure of the oil is less than the threshold (e.g., at 408), the engine 104 can be stopped. In some embodiments in which the engine 104 has been activated and is running subsequent to the cranking, the controller 102 stops the engine 104 by cutting off fuel to the engine 104, preventing spark plug ignition, maintaining intake valves in a closed position, maintaining exhaust valves in an open position, or the like. In some embodiments in which the engine 104 has not been activated subsequent to the cranking, the controller 102 stops the engine 104 by preventing the cranking. In some embodiments, further at 410, the controller 102 is configured to recycle power of the controller 102 responsive to the pressure of the oil being less than the threshold (determined at 408).

Referring again to operation 412, in response to determining that the pressure of the oil is equal to or greater than the threshold (e.g., at 408), the cranking of the engine 104 can continue to be permitted. The controller 102 can permit cranking of the engine 104 as disclosed herein with respect to operation 404.

Figure 5:
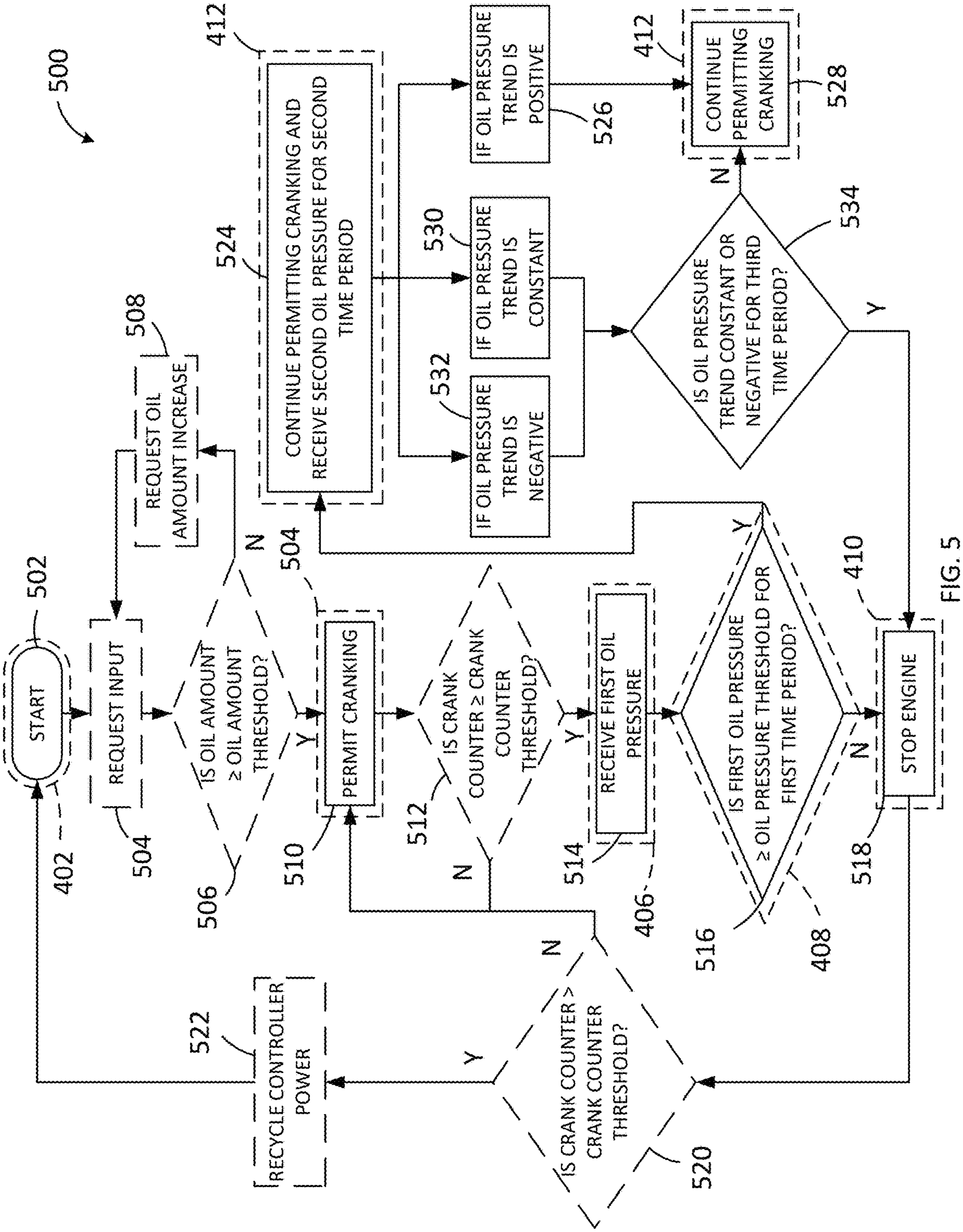
FIG. 5 is a flow diagram of another method for engine crank control of the engine system, according to some embodiments.

FIG. 5 illustrates a flow diagram of the method 500 for engine crank control of the engine system 100, according to some embodiments. The method 500 can be performed by the controller 102 including various circuits, instructions, processors, or other logical components, such as the logical components described at FIG. 6 or otherwise herein. The method 500 can include (e.g., at 502) starting the method 500. This can include, for example, preventing, by the controller 102, cranking of the engine 104. The method 500 can include (e.g., at 504) requesting input. For example, the method 500 can include causing presentation of, by the controller 102 on a display, a message requesting a confirmation from a user that a sufficient amount of an oil is available for the cranking of the engine 104. The method 500 can include (e.g., at 510) permitting cranking. For example, the method 500 can include, in response to receiving a user interaction indicative of the sufficient amount of the oil being available, permitting, by the controller 102, the cranking. The method 500 can include (e.g., at 514) receiving first oil pressure. For example, the method 500 can include monitoring, by the controller 102 during a period subsequent to initiation of the cranking of the engine 104, a pressure of the oil of the lubrication system 106. The method 500 can include (e.g., at 524) continuing to permit the cranking. For example, the method 500 can include, in response to the pressure being equal to or greater than a threshold, continuing to permit, by the controller 102, the cranking.

The method 500 can include (e.g., at 506) determining whether an oil amount is equal to or greater than an oil amount threshold. The method 500 can include (e.g., at 508) requesting an oil amount increase. The method 500 can include (e.g., at 512) determining whether a crank counter is equal to or greater than a crank counter threshold. The method 500 can include (e.g., at 516) determining whether the first oil pressure is equal to or greater than an oil pressure threshold for a first time period. The method 500 can include (e.g., at 518) stopping the engine 104. The method 500 can include (e.g., at 520) determining whether the crank counter is greater than the crank counter threshold. The method 500 can include (e.g., at 522) recycling power of the controller 102. The method 500 can include (e.g., at 526) determining if oil pressure trend is positive. The method 500 can include (e.g., at 528), if the oil pressure trend is positive, continuing to permit the cranking. The method 500 can include (e.g., at 530) determining if the oil pressure trend is constant. The method 500 can include (e.g., at 532) determining if the oil pressure trend is negative. The method 500 can include (e.g., at 534), if the oil pressure trend is constant or negative, determining whether the oil pressure trend is negative or constant for a third time period.

Referring again to operation 502, the method 500 is started. In some embodiments, the controller 102 starts the method 500 in response to receiving electrical energy from a power source of the engine system 100, such as a battery, a generator, etc. In some embodiments, the controller 102 starts the method 500 by preventing cranking of the engine 104, as disclosed herein with respect to operation 402.

Referring again to operation 504, input regarding the amount of the oil available to the engine 104 is requested. The controller 102 can request input regarding the oil level within the oil pan 302. In some embodiments, the controller 102 requests the input from the user via the user interface. For example, the controller 102 can cause presentation of, on a display visible to the user, a message requesting a confirmation from the user that the oil amount is equal to or greater than the oil amount threshold. For example, the message can request from the user to check the amount of the oil available to the engine 104 and to provide to the controller 102 a value associated with the amount of the oil available and/or a binary value indicating whether the amount of the oil available is sufficient for the engine 104 to crank (e.g., equal to or greater than the oil amount threshold, etc.). In some embodiments, the controller 102 requests the input from the oil amount sensor (i.e., at least one of the sensors 108, at least one of the sensors 312, etc.). For example, the controller 102 can receive the amount signal from the oil amount sensor and determine the amount of the oil based on the amount signal.

Referring again to operation 506, it is determined whether the oil amount (determined at 504) is equal to or greater than an oil amount threshold. In some embodiments, the controller 102 receives, from an input device, a user interaction associated with the indication (i.e., the indication of sufficient amount of the oil for the cranking). The user interaction can include a value associated with the amount of the oil available being equal to or greater than the oil amount threshold and/or a binary value indicating that the amount of the oil available is sufficient for the engine 104 to crank (e.g., equal to or greater than the oil amount threshold, etc.). In some embodiments, the display includes the input device (e.g., a touch-screen display, a multi-touch screen display, etc.). In response to determining that the oil amount is equal to or greater than the oil amount threshold, the controller 102 proceeds to operation 510 of the method 500 and/or operation 404 of the method 400. In response to determining that the oil amount is less than the oil amount threshold, the controller 102 proceeds to operation 508 of the method 500.

An oil amount value (e.g., the oil amount, etc.) that the controller 102 compares to the oil amount threshold can be a single oil amount value that is associated with a most-recently (e.g., newest, last, etc.) received amount signal from the oil amount sensor (e.g., at least one of the sensors 108, at least one of the sensors 312, etc.). The oil amount value that the controller 102 compares to the oil amount threshold can be a statistic of multiple oil amount values. For example, the oil amount value that the controller 102 compares to the oil amount threshold can be a minimum, a maximum, a mean, a median, or a mode of multiple oil amount values associated with received amount signals from the oil amount sensor (e.g., at least one of the sensors 108, at least one of the sensors 312, etc.). In some embodiments, the oil amount threshold is associated with a minimum oil amount value sufficient for cranking of the engine 104 and/or for the engine 104 to start without dry running, thereby protecting the engine 104 from damage.

Referring again to operation 508, an oil amount increase is requested. The controller 102 can request the oil amount increase in response to determining that the oil amount is less than the oil amount threshold (e.g., at 506). The controller 102 can request the oil amount increase from the user via the user interface. For example, the controller 102 presents, on a display visible to the user, a message requesting additional oil in the engine system 100 (e.g., the lubrication system 106, the oil pan 302, etc.). The message can indicate an amount (e.g., a minimum amount, a maximum amount, an average amount, etc.) of oil the user should add. The lubrication system 106 can include an auxiliary oil source (e.g., an oil tank, an oil reservoir, etc.) that is fluidly coupled to the oil pump 304. The auxiliary oil source can be mechanically coupled or uncoupled to the engine 104 and/or components of the lubrication system 106 (e.g., the oil pan 302, the oil pump 304, the oil filter 310, the oil rifle 308, etc.). In some embodiments, requesting the oil amount increase can include the controller 102 operating the oil pump 304 to retrieve the oil from the auxiliary oil source and provide the oil to the oil rifle 308, the engine components 306, and/or the engine 104.

In some embodiments, the indication of the sufficient amount of the oil for the cranking of the engine 104 that the controller 102 receives is a first indication. The controller 102 can further receive, prior to the first indication, a second indication of an insufficient amount of the oil for the cranking of the engine 104. The controller 102 can, prior to receiving the first indication, prevent the cranking of the engine 104 responsive to receiving the second indication. For example, at 502, the controller 102 can start the method 500, at 504, the controller 102 can request the input regarding the amount of the oil available to the engine 104, at 506, the controller 102 can determine that the oil amount (determined at 504) is less than the oil amount threshold (i.e., the second indication), and, at 508, the controller 102 can request the oil amount increase. The amount of the oil available to the engine 104 can increase (i.e., via the user, the lubrication system 106, etc.) to be equal to or greater than the oil amount threshold, and the controller 102 can proceed to repeat operations 504 and 506, where (at repeated 506) the controller 102 can determine that the oil amount available to the engine 104 is equal to or greater than the oil amount threshold (i.e., the first indication) and proceed to operation 510.

In some embodiments, at 504, a first message is presented requesting a confirmation from the user that there is the sufficient amount of the oil for the cranking of the engine 104. In some embodiments, the controller 102 can be configured to cause presentation of the first message. The controller 102 can receive a user interaction from the user that is associated with the second indication (i.e., that the oil amount is less than the oil amount threshold) (e.g., at 506). The controller 102 can, in response to receiving the second indication (e.g., at 506), cause presentation of a second message requesting the increase in the oil amount (e.g., at 508). In some embodiments, the second message can include the first message.

Referring again to operation 510, the engine 104 is permitted to crank. The controller 102 can permit the engine 104 to crank as disclosed herein with respect to operation 404. In some embodiments, at 510, the controller 102 cranks the engine 104 at least one time (e.g., performs at least one crank, rotates the flywheel ring gear by at least one full revolution, etc.) and/or requests from the user, via the user interface, to crank the engine 104 at least once.

Referring again to operation 512, it is determined whether the crank counter (e.g., the crank counter 124) is equal to or greater than the crank counter threshold. The crank counter identifies a number of times the engine 104 has been cranked. For example, the crank counter can identify the number of times the engine 104 has been cranked after cranking has been permitted at 510 and/or 404. The crank counter threshold can correspond to a minimum number of cranks of the engine 104 for the oil pump 304 to circulate a sufficient amount of the oil in the engine system 100 (e.g., the engine 104, the lubrication system 106, etc.) to provide an accurate reading of the oil pressure. The crank counter threshold can correspond to a maximum number of dry cranks (i.e., cranks with insufficient amount of oil for cranking) that can be performed before causing damage (e.g., minimal damage, significant damage, etc.) to the engine 104, thereby protecting the engine 104. The crank counter threshold can correspond to both (i) the minimum number of cranks for the oil pump 304 to circulate a sufficient amount of the oil in the engine system 100 and (ii) the maximum number of dry cranks that can be performed. In some examples, the crank counter threshold is two. In some examples, the crank counter threshold is less than two (i.e., one or zero) or greater than two (e.g., three, four, seven, etc.).

In response to determining that the crank counter is equal to or greater than the crank counter threshold, the controller 102 proceeds to operation 514 of the method 500. In response to determining that the crank counter is less than the crank counter threshold, the controller 102 returns to operation 510 of the method 500.

Referring again to operation 514, in response determining that the crank counter is equal to or greater than the crank counter threshold (determined at 512), the first oil pressure is received. In some embodiments, monitoring the pressure of the oil (e.g., at 406) includes receiving, by the controller 102, the first oil pressure signal associated with the first oil pressure. The controller 102 can receive the first oil pressure (e.g., the pressure value) as disclosed herein with respect to operation 406 (i.e., monitoring the pressure includes receiving the first oil pressure). For example, the controller 102 can receive a first pressure signal from the pressure sensor (e.g., at least one of the sensors 108, at least one of the sensors 312, etc.) and determine the first oil pressure based on the first pressure signal. The controller 102 can receive the first oil pressure during the period subsequent to the initiation of the cranking of the engine 104 (e.g., at 510). The period subsequent to the initiation of the cranking of the engine 104 can be associated with a number of cranking attempts.

The controller 102 receiving the first oil pressure can include the controller 102 determining a single first pressure value that is associated with a most-recently (e.g., newest, last, etc.) received first pressure signal from the pressure sensor (e.g., at least one of the sensors 108, at least one of the sensors 312, etc.). The controller 102 receiving the first oil pressure can include the controller 102 determining multiple first pressure values that are each associated with one of first pressure signals from the pressure sensor (e.g., at least one of the sensors 108, at least one of the sensors 312, etc.). In some embodiments, the controller 102 can receive the first pressure signals from the pressure sensor for a first time period.

Referring again to operation 516, it is determined whether the first oil pressure (determined at 514 and/or at 406) is equal to or greater than an oil pressure threshold (e.g., the threshold) for the first time period. The controller 102 can determine whether the first oil pressure is equal to or greater than the oil pressure threshold as disclosed herein with respect to operation 408.

The controller 102 can compare the oil pressure threshold to a single first oil pressure value associated with a first pressure signal received from the pressure sensor (e.g., at least one of the sensors 108, at least one of the sensors 312, etc.) during the first time period. The first pressure signal can be the only, the first, the last, a random, etc. pressure signal received by the controller 102 from the pressure sensor during the first time period. The controller 102 can compare the oil pressure threshold to multiple first oil pressure values associated with first pressure signals received from the pressure sensor (e.g., at least one of the sensors 108, at least one of the sensors 312, etc.) during the first time period. For example, the controller 102 receiving the first oil pressure includes the controller 102 receiving multiple first oil pressure values in the first time period, and the controller 102 determines whether each of the first oil pressure values is equal to or greater than the oil pressure threshold. The controller 102 can compare the oil pressure threshold to a statistic of the multiple first oil pressure values received by the controller 102 during the first time period. For example, the first pressure value that the controller 102 compares to the threshold can be a minimum, a maximum, a mean, a median, or a mode of the multiple first pressure values associated with received first pressure signals from the pressure sensor (e.g., at least one of the sensors 108, at least one of the sensors 312, etc.) during the first time period.

Referring again to operation 518, in response the first oil pressure being less than the oil pressure threshold for the first time period (determined at 516 and/or at 408), the engine 104 is stopped. The controller 102 can stop the engine 104 as disclosed herein with respect to operation 410.

Referring again to operation 520, it is determined whether the crank counter (e.g., the crank counter 124) is greater than the crank counter threshold. In response to determining that the crank counter is greater than the crank counter threshold, the controller 102 proceeds to operation 522 of the method 500, operation 502 of the method 500, and/or operation 402 of the method 400. In response to determining that the crank counter is equal to or less than the crank counter threshold, the controller 102 proceeds to operation 510 of the method 500 and/or operation 404 of the method 400.

Referring again to operation 522, in response to determining that the crank counter is greater than the crank counter threshold (determined at 520), the power of the controller 102 is recycled. Recycling the power of the controller 102 can include a shutdown latch that prevents cranking of the engine 104 until recycling protocol is performed. The recycling protocol can include an authorized user removing the shutdown latch that cannot be removed by an unauthorized user. The recycling protocol can further include the authorized user confirming whether the oil amount is sufficient for cranking the engine 104. Recycling the power of the controller 102 can include restarting the controller 102. Recycling the power of the controller 102 can include clearing (e.g., wiping, etc.) a memory (e.g., random access memory (RAM), storage device, the data repository 120 (e.g., the input data 122, the crank counter 124, the oil pressure data 126, and/or the time data 128), etc.) electrically or communicatively coupled to the controller 102. In response to recycling the power of the controller 102, the controller 102 can return to operation 502 of the method 500 and/or operation 402 of the method 400. In some embodiments, in response to recycling the power of the controller 102, the controller 102 requires servicing from the user (e.g., resetting the controller 102, resetting power supply of the controller 102, etc.) prior to returning to operation 502 of the method 500 and/or operation 402 of the method 400.

In some embodiments, at 522, in response to stopping the engine 104 (e.g., at 518 and/or at 410) and the crank counter (e.g., the crank counter 124, a number of cranking attempts, etc.) being greater than the crank counter threshold (e.g., at 520), the power of the controller 102 is recycled. At 504, in response to recycling the power of the controller 102 (e.g., at 522), the input associated with the amount of the oil is requested again (i.e., repeat operation 504, where operation 504 was performed by the controller 102 at least once prior to recycling power of the controller 102 (e.g., at 522) and repeated after recycling the power of the controller 102).

In some embodiments, at 510 and/or at 404, in response to stopping the engine 104 (e.g., at 518 and/or at 410) and the crank counter (e.g., the crank counter 124, a number of cranking attempts, etc.) being equal to or less than the crank counter threshold (determined at 520), the cranking is permitted until the crank counter is equal to the crank counter threshold.

In some embodiments, at 514 and/or at 406, in response to stopping the engine 104 (e.g., at 518 and/or at 410) and the crank counter (e.g., the crank counter 124, the number of cranking attempts, etc.) being equal to the crank counter threshold, a new pressure of the oil of the lubrication system 106 is monitored (e.g., a new value of the first oil pressure). At 516 and/or at 408, it is determined whether the new pressure of the oil is equal to or greater than the oil pressure threshold (e.g., the threshold, etc.). At 518 and/or at 410, in response to the new pressure being less than the oil pressure threshold (determined at 516 and/or at 408), the engine 104 is stopped. At 520, it is determined whether the crank counter is greater than the crank counter threshold. At 510 and/or at 404, in response to stopping the engine 104 (e.g., at 518 and/or at 410) and the crank counter (e.g., the crank counter 124, the number of cranking attempts, etc.) being equal to or less than the crank counter threshold (determined at 520), the cranking is permitted until the crank counter is equal to the crank counter threshold.

Referring again to operation 524, in response to determining that the first oil pressure is equal to or greater than the oil pressure threshold (e.g., the threshold) (determined at 516 and/or at 408), the cranking of the engine 104 is continued to be permitted and a second oil pressure is received for a second time period. The second time period can be less than the first time period. The controller 102 can continue permitting the cranking of the engine 104 as disclosed herein with respect to operation 412. Receiving the second oil pressure (e.g., the pressure value) can include the controller 102 receiving a second pressure signal from the pressure sensor (e.g., at least one of the sensors 108, at least one of the sensors 312, etc.) during the second time period and determining the second oil pressure based on the second pressure signal.

The controller 102 receiving the second oil pressure can include the controller 102 determining a single second pressure value that is associated with the second pressure signal from the pressure sensor (e.g., at least one of the sensors 108, at least one of the sensors 312, etc.) during the second time period. In some examples, the second pressure signal can be a most-recently (e.g., newest, last, etc.) received second pressure signal from the pressure sensor during the second time period. In some examples, the second pressure signal can be the only, the first, a random, etc. pressure signal received by the controller 102 from the pressure sensor during the second time period. The controller 102 receiving the second oil pressure can include the controller 102 determining multiple second pressure values that are each associated with one of second pressure signals from the pressure sensor (e.g., at least one of the sensors 108, at least one of the sensors 312, etc.) during the second time period.

Referring again to operations 526, 530, and 532, a trend of oil pressure values is determined. The controller 102 can determine the trend of the second oil pressure (i.e., the multiple second pressure values) received at 524 and/or 412. The controller 102 can determine the trend of the first oil pressure (i.e., the multiple first pressure values) received at 514 and/or 406. The controller 102 can determine the trend of a combination of the second oil pressure (e.g., the single second pressure value, the multiple second pressure values, etc.) received at 524 and/or 412 and the first oil pressure (e.g., the single first pressure value, the multiple first pressure values, etc.) received at 514 and/or 406. In some embodiments, the controller 102 determines the trend of the oil pressure values responsive to receiving the second oil pressure and/or the second oil pressure signal from the pressure sensor (e.g., at least one of the sensors 108, at least one of the sensors 312, etc.).

At 526, the oil pressure trend of the oil pressure values (e.g., the single first pressure value, the single second pressure value, the multiple first pressure values, and/or multiple second pressure values) is determined to be substantially positive (e.g., generally positive, linearly positive, exponentially positive, etc.). At 528, in response determining that the oil pressure trend of the oil pressure values is substantially positive, the cranking of the engine 104 is continued to be permitted. The controller 102 can continue permitting the cranking of the engine 104 as disclosed herein with respect to operation 524 of the method 500 and/or operation 412 of the method 400.

At 530, the oil pressure trend of the oil pressure values (e.g., the single first pressure value, the single second pressure value, the multiple first pressure values, and/or multiple second pressure values) is determined to be substantially constant (e.g., generally constant, etc.). At 532, the oil pressure trend of the oil pressure values is determined to be substantially negative (e.g., generally negative, linearly negative, exponentially negative, etc.).

Referring again to operation 534, in response to determining that the oil pressure trend of the oil pressure values (e.g., the single first pressure value, the single second pressure value, the multiple first pressure values, and/or multiple second pressure values) is substantially constant (determined at 530) or substantially negative (determined at 532), it is determined whether the oil pressure trend is substantially constant or substantially negative for a third time period. In response to the oil pressure trend being substantially constant or substantially negative for the third time period, the controller 102 proceeds to operation 518 of the method 500 and/or operation 410 of the method 400. In response to the oil pressure trend not being substantially constant or substantially negative for the third time period (e.g., the oil pressure trend becomes substantially positive during the third time period, etc.), the controller 102 proceeds to operation 528 of the method 500 and/or operation 412 of the method 400. In some embodiments, in response to determining that the oil pressure trend is substantially constant or substantially negative, the controller 102 stops the engine 104. In some embodiments, the third time period is equal to the second time period.

It is to be appreciated that the operations of the method 400 (i.e., 402, 404, 406, 408, 410, 412, etc.) can be combined, omitted, and/or reordered relative to each other. Similarly, it is to be appreciated that the operations of the method 500 (i.e., 502, 504, 506, 508, 510, 512, 514, 516, 518, 520, 522, 524, 526, 528, 530, 532, 534, etc.) can be combined, omitted, and/or reordered relative to each other. For example, operation 402 of the method 400 and operations 504, 506, 508, 512, 520, and 522 of the method 500 can be omitted. Similarly, other operations of the method 400 and/or the method 500 can be omitted.

It is also to be appreciated that the controller 102 can cause one or more of the operations of the method 400 and/or the method 500 disclosed herein, such as by employing another element of the engine system 100. For example, operations disclosed by other components of the engine system 100 (e.g., controlling cranking of the engine 104, operation of the oil pump 304, recycling power of the controller 102, presenting messages on the display, etc.) can be initiated, scheduled, or otherwise controlled by the controller 102.

Figure 6:
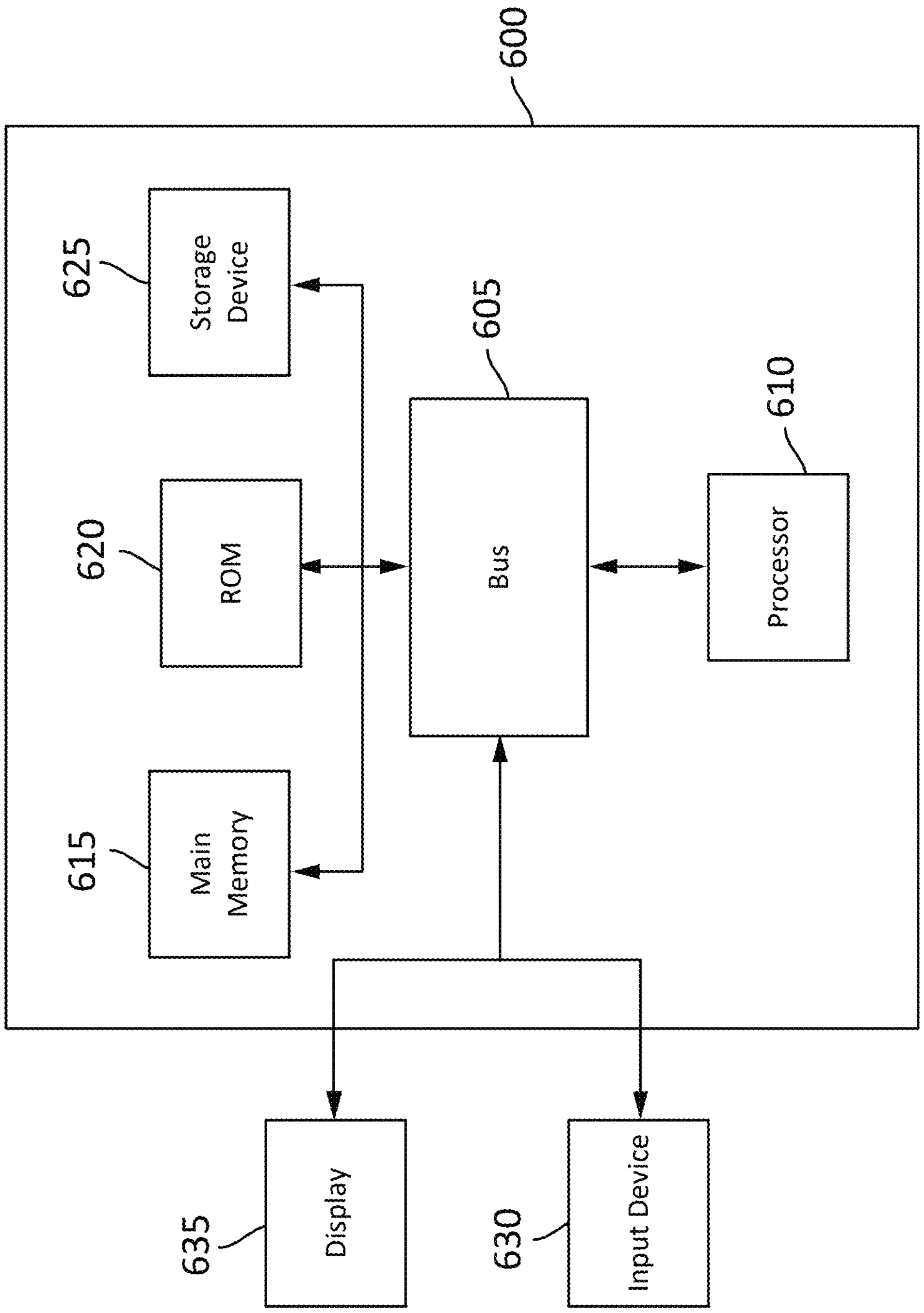
FIG. 6 is a block diagram illustrating an example architecture for a computer system that can be employed to operate the systems and methods described and illustrated herein.

FIG. 6 is a block diagram illustrating an example architecture for a computer system 600 (e.g., computing device, computing system, etc.) that can be employed to implement elements of the systems (e.g., the engine system 100, etc.) and methods (e.g., the method 400, the method 500, etc.) described and illustrated herein. The computer system 600 can include or be used to implement the controller 102 or its components, and components of the systems (e.g., the engine system 100, etc.) provided herein. The computer system 600 includes at least one bus 605 or other communication component for communicating information, and at least one processor 610 or processing circuit coupled with the bus 605 for processing information. The computer system 600 also includes at least one main memory 615, such as a random-access memory (RAM) or other dynamic storage device, coupled with the bus 605 for storing information and instructions to be executed by the processor 610. The main memory 615 can be used for storing information during execution of instructions by the processor 610. The computer system 600 can further include at least one read only memory (ROM) 620 or other static storage device coupled with the bus 605 for storing static information and instructions for the processor 610. A storage device 625, such as a solid-state device, magnetic disk or optical disk, can be coupled with the bus 605 to persistently store information and instructions (e.g., for the data repository 120, etc.).

The computer system 600 can be coupled via the bus 605 to a display 635, such as a liquid crystal display, an active-matrix display, a multi-touch display, etc. An input device 630, such as a keyboard, mouse, a microphone, or the multi-touch display, can be coupled with the bus 605 for communicating information and commands to the processor 610.

The systems (e.g., the engine system 100) and methods (e.g., the method 400, the method 500, etc.) described herein can be implemented by the computer system 600 in response to the processor 610 executing an arrangement of instructions contained in main memory 615. Such instructions can be read into the main memory 615 from another computer-readable medium, such as the storage device 625. Execution of the arrangement of instructions contained in the main memory 615 causes the computer system 600 to perform the operations and/or methods described herein. One or more processors in a multi-processing arrangement can also be employed to execute the instructions contained in the main memory 615. Hard-wired circuitry can be used in place of, or in combination with, software instructions together with the systems and methods described herein. Systems and methods described herein are not limited to any specific combination of hardware circuitry and software.

The controller 102, the engine 104, the lubrication system 106, the sensors 108, the telematics interface 110, the oil pump 304, and/or the sensors 312 can each include or interface with at least one processing unit or other logic device, such as a programmable logic array engine or module configured to communicate with a database (e.g., the data repository 120, etc.). The controller 102, the engine 104, the lubrication system 106, the sensors 108, the telematics interface 110, the data repository 120, the oil pump 304, and/or the sensors 312 can be separate components, a single component, or part of the engine system 100. The engine system 100 and various components thereof can include hardware components, such as one or more processors, logic devices, or circuits. For example, the engine system 100 can include one or more components or structures of functionality of the computer system 600 depicted in FIG. 6.

Although an example computing system has been described in FIG. 6, the subject matter described in this specification can be implemented in other types of digital electronic circuitry, or in computer software, firmware, or hardware, including the structures disclosed in this specification and their structural equivalents, or in combinations of one or more of them.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining can be stationary (e.g., permanent or fixed) or moveable (e.g., removable or releasable). Such joining can be achieved with the two members coupled directly to each other, with the two members coupled with each other using one or more separate intervening members, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling can be mechanical, electrical, or fluidic. For example, circuit A communicably "coupled" to circuit B can signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements can differ according to other exemplary embodiments, and that such variations are intended to be encompassed by the present disclosure. The term "or," as used herein, is used in its inclusive sense (and not in its exclusive sense) so that when used to connect a list of elements, the term "or" means one, some, or all of the elements in the list.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the systems and methods as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. An engine crank controller configured to:

permit cranking of an engine responsive to receiving an indication of a sufficient amount of an oil for the cranking of the engine;

monitor, during a period subsequent to initiation of the cranking of the engine, a pressure of the oil of a lubrication system;

in response to the pressure being less than a threshold, stop the engine by preventing the cranking; and in response to the pressure being equal to or greater than the threshold, continue permitting the cranking.

2. The engine crank controller of claim 1, wherein:

the indication is a first indication; and the engine crank controller is further configured to, prior to receiving the first indication, prevent the cranking responsive to receiving a second indication of an insufficient amount of the oil for the cranking of the engine.

3. The engine crank controller of claim 2, wherein the engine crank controller is further configured to:

cause presentation of a first message requesting a confirmation from a user that there is the sufficient amount of the oil for the cranking of the engine;

receive a user interaction associated with the second indication; and in response to receiving the second indication, cause presentation of a second message requesting an increase in oil amount.

4. The engine crank controller of claim 1, wherein the indication, received by the engine crank controller, is associated with a level of the oil in an oil pan of the lubrication system being equal to or above a threshold level.

5. The engine crank controller of claim 1, wherein:

the period is associated with a number of cranking attempts; and the engine crank controller is further configured to:

in response to stopping the engine and the number of cranking attempts being greater than a crank counter threshold, recycle power of the engine crank controller, in response to stopping the engine and the number of cranking attempts being less than the crank counter threshold, permit the cranking until the number of cranking attempts is equal to the crank counter threshold, and in response to stopping the engine and the number of cranking attempts being equal to the crank counter threshold:

monitor a new pressure of the oil of the lubrication system, in response to the new pressure being less than the threshold, stop the engine, and permit the cranking until the number of cranking attempts is greater than the crank counter threshold.

6. The engine crank controller of claim 5, wherein the engine crank controller is further configured to, in response to recycling the power of the engine crank controller, request input associated with an amount of the oil.

7. The engine crank controller of claim 1, wherein the engine crank controller is further configured to recycle power of the engine crank controller responsive to the pressure being less than the threshold.

8. A method for engine crank control, comprising:

preventing, by a controller, cranking of an engine;

causing presentation of, by the controller on a display, a message requesting a confirmation from a user that a sufficient amount of an oil is available for the cranking of the engine;

in response to receiving a user interaction indicative of the sufficient amount of the oil being available, permitting, by the controller, the cranking;

monitoring, by the controller during a period subsequent to initiation of the cranking of the engine, a pressure of the oil of a lubrication system; and in response to the pressure being equal to or greater than a threshold, continuing to permit, by the controller, the cranking.

9. The method of claim 8, wherein:

monitoring the pressure of the oil comprises receiving, by the controller, a first oil pressure signal associated with a first oil pressure; and the method further comprises:

in response to the first oil pressure being equal to or greater than the threshold, continuing to permit, by the controller, the cranking and receiving, by the controller, a second oil pressure signal associated with a second oil pressure, in response to receiving the second oil pressure signal, determining, by the controller, an oil pressure trend, and in response to the oil pressure trend being constant or negative, stopping, by the controller, the engine.

10. The method of claim 9, wherein the oil pressure trend is determined based on the first oil pressure and the second oil pressure.

11. The method of claim 8, wherein:

the period is associated with a number of cranking attempts;

monitoring the pressure of the oil comprises, in response to the number of cranking attempts being equal to or greater than a crank counter threshold, receiving, by the controller, a plurality of first oil pressure signals associated with a plurality of first oil pressures for a first time period; and the method further comprises:

in response to the first oil pressures being equal to or greater than the threshold for the first time period, continuing to permit, by the controller, the cranking and receiving, by the controller, a plurality of second oil pressure signals associated with a plurality of second oil pressures for a second time period, and in response to an oil pressure trend of the second oil pressures being constant or negative, stopping, by the controller, the engine.

12. The method of claim 11, wherein the second time period is less than the first time period.

13. The method of claim 11, further comprising, in response to the oil pressure trend of the second oil pressures being positive, continuing, by the controller, to permit the cranking.

14. The method of claim 11, wherein the stopping of the engine is responsive to the oil pressure trend of the second oil pressures being constant or negative for a third time period.

15. The method of claim 14, wherein the third time period is equal to the second time period.

16. The method of claim 11, further comprising, in response to the oil pressure trend of the second oil pressure not being constant or negative for a third time period, continuing, by the controller, to permit the cranking.

17. An engine system comprising:

an engine;

a lubrication system configured to lubricate the engine; and a controller configured to:

prevent cranking of the engine, permit cranking of the engine responsive to receiving an indication of a sufficient amount of an oil for the cranking of the engine, receive, during a period subsequent to initiation of the cranking of the engine, a plurality of first oil pressure signals associated with a plurality of first oil pressures for a first time period, in response to the first oil pressures being equal to or greater than an oil pressure threshold for the first time period, continue permitting the cranking and receive a plurality of second oil pressure signals associated with a plurality of second oil pressures for a second time period, and in response to an oil pressure trend of the second oil pressures being positive, continue permitting the cranking.

18. The engine system of claim 17, wherein:

the indication is associated with an oil amount being equal to or greater than an oil amount threshold; and the controller is further configured to:

cause presentation of, on a display, a message requesting a confirmation from a user that the oil amount is equal to or greater than the oil amount threshold, and receive, from an input device, a user interaction associated with the indication.

19. The engine system of claim 18, wherein the display comprises the input device.

20. The engine system of claim 17, wherein:

the engine comprises a main oil gallery; and the engine system further comprises a pressure sensor located at least partially within the main oil gallery.

* * * * *